United States Patent [19]
Kitamura et al.

[11] 3,831,500
[45] Aug. 27, 1974

[54] APPARATUS FOR EFFECTING OSCILLATORY MOVEMENT OF AN OUTPUT MEMBER

[75] Inventors: Yoshiaki Kitamura, Kamagaya-machi; Shigemi Misono, Tokyo, both of Japan

[73] Assignee: Kabushiki Kaisha Daini Seikosha, Tokyo, Japan

[22] Filed: Oct. 13, 1972

[21] Appl. No.: 297,355

[30] Foreign Application Priority Data
Oct. 13, 1971    Japan .............................. 46-80674

[52] U.S. Cl. .......................... 92/68, 92/85, 92/137
[51] Int. Cl. ....... F01b 11/02, F01b 9/00, F01b 7/04
[58] Field of Search ............. 92/137, 85, 143, 68, 8, 92/9, 10; 91/186

[56] References Cited
UNITED STATES PATENTS

| | | | |
|---|---|---|---|
| 125,976 | 4/1872 | Morgan................................... | 92/85 |
| 541,785 | 6/1895 | Doolittle................................ | 92/85 |
| 2,664,860 | 1/1954 | Levetus.................................. | 92/85 |
| 3,267,816 | 8/1966 | Graham................................ | 92/137 |
| 3,464,317 | 9/1969 | Woodward............................ | 92/137 |

FOREIGN PATENTS OR APPLICATIONS
198,866    0/1967    U.S.S.R................................ 92/137

*Primary Examiner*—Paul E. Maslousky
*Attorney, Agent, or Firm*—Robert E. Burns; Emmanuel J. Lobato; Bruce L. Adams

[57] ABSTRACT

An apparatus for effecting oscillatory movement of an output member comprises a pair of single-acting fluid reciprocatory motors each having a working piston reciprocal through a working stroke and a return stroke and the motors are alternately supplied with motive fluid to effect synchronous reciprocation of the working pistons in opposite stroke directions. Each working piston is connected to a common roller chain and the roller chain engages with chain sprockets around the periphery of the output member so that alternate movement of each working piston through its working stroke drives the roller chain in opposite directions to thereby impart oscillatory movement to the output member. A dampening device is connected to each reciprocatory motor to dampen the impact of each working piston at the end of both its working and return strokes.

8 Claims, 3 Drawing Figures

3,831,500

PATENTED AUG 27 1974

APPARATUS FOR EFFECTING OSCILLATORY MOVEMENT OF AN OUTPUT MEMBER

The present invention relates generally to an apparatus for actuating an output member and more particularly, to an apparatus for effecting oscillatory movement of an output member in an industrial robot.

Industrial robots are in widespread use today to perform a variety of different operations. Most such robots have a movable transfer arm, a manipulator device connected to an end of the transfer arm, and various actuators to actuate both the transfer arm and manipulator device to perform diverse movements with a high degree of positional accuracy.

One type of movement usually found in industrial robots is a sweep movement or oscillatory movement of the robot transfer arm. It has been proposed to use a fluid oscillatory motor to effect oscillating movement of the robot arm and such is described in detail in U.S. patent application Ser. No. 212,344 filed on Dec. 27, 1971 now U.S. Pat. No. 3,777,618 and which is commonly owned with the present application. In this application, an oscillatory motor is disclosed which has two working chambers separated by a movable vane and fluid is selectively supplied to and exhausted from the working chambers to effect oscillatory movement of the vane.

The oscillatory fluid motor disclosed in the foregoing patent application has certain drawbacks. Since the working chambers have an arcuate configuration, it is difficult to fluidtightly seal the vane in the working chambers and motive fluid frequently leaks past the vane into the other working chamber. Since the oscillatory motor is mounted within the robot, the motor must have a small size and therefore the motor exhibits a weak actuating force. In addition, the oscillatory motor has a poor cushioning or buffer effect with the undesirable result that shocks are oftentimes imparted to the robot and therefore the oscillatory notor must be driven at a comparatively low speed.

It is therefore a primary object of the present invention to provide an apparatus for effecting oscillatory movement of an output member at high speeds.

It is another object of the present invention to provide an apparatus which converts the synchronous linear movements of two reciprocatory motors into an oscillatory movement.

It is a further object of the present invention to provide an apparatus for effecting angular displacement of an output member at high speeds and with a high actuating force.

It is yet another object of the present invention to provide an apparatus for effecting oscillatory movement of an output member at high speeds and which effectively cushions the motion of the output member at the end of each oscillating stroke.

These and other objects of the invention are carried out by an apparatus comprising a pair of fluid-actuated reciprocatory motors each having a reciprocating working member, a rotatably mounted output member positioned between the pair of reciprocatory motors, and a flexible chain connected to the working member of each motor and connected to the output member so that synchronous reciprocation of the working members in opposite directions effects oscillatory movement of the output member. A dampening device is connected to each reciprocatory motor to dampen the movement of each working member as it reaches the end of its stroke thereby preventing shocks from developing and being transmitted to the remainder of the apparatus.

Having in mind the above and other objects that will be evident from an understanding of the disclosure, the present invention comprises the combinations and arrangements of parts illustrated in the preferred embodiment of the invention which is hereinafter set forth in sufficient detail to enable those persons skilled in the art to clearly understand the function, operation, construction and advantages of it when read in conjunction with the accompanying drawings, wherein like reference characters denote like parts in the various view, and wherein:

FIG. 1 shows the actuating means for actuating an output member in an oscillatory manner. The actuating means comprises a pair of actuator assemblies A and B connected together to a common output member (not shown in FIG. 1) to actuate the output member in response to synchronous actuation of the actuator assemblies.

Figure 1:
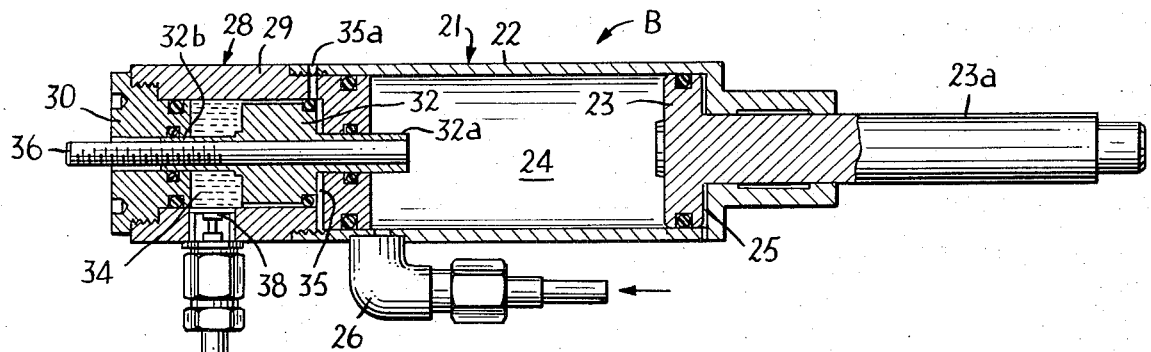
FIG. 1 is an explanatory view, partly in cross-section, of a pair of single-acting reciprocatory motors used in the apparatus of the present invention.

The actuator assembly A comprises a single-acting fluid reciprocatory motor 1 and a dampening device 8. The motor 1 comprises a cylinder 2 having reciprocally mounted therein a working piston 3. The working piston 3 is mounted for linear reciprocal movement within the cylinder and has connected thereto a piston rod 3a which slidably extends out of the cylinder. The working piston 3 divides the interior of the cylinder 2 into a working chamber 4 and a nonworking chamber 5 which is vented to the atmosphere through a bleed hole. A conduit 6 communicates with the working chamber 4 and functions to supply and exhaust motive fluid to the chamber during operation of the fluid motor.

The dampening device 8 comprises a dampening cylinder 9 having a closed end defining a wall portion of the working chamber 4 and an open end which is closed by an end cap 10. A dampening piston 11 is slidably mounted within the cylinder 9 and defines therewith on one side of the piston 11 a variable volume oil chamber or dampening chamber 12 and defines therewith on the other side of the piston 11 an air chamber 13 which is vented to the atmosphere through a bleed opening 13a. The oil chamber 12 communicates through a flow orifice 16 with an oil conduit 17 for a purpose to be described hereinafter.

The ends of the cylinder 9 are each provided with a throughbore and a rod portion 11a of the piston 11 slidably extends in one of the throughbores and a rod portion 11b is slidably extends into the other throughbore. A rod 14 is threaded into the rod portion 11b and always projects out of the end cap 10 irrespective of the position of the piston 11 thereby enabling the piston 11 to be manually positioned from outside of the cylinder 9.

A sealing ring 15a is disposed within a groove in the dampening cylinder 9 to fluidtightly seal the oil chamber 12 from the air chamber 13 and a set of sealing rings 15b are provided in corresponding grooves in the ends of the cylinder 9 to provide a fluidtight seal between the cylinder 9 and the dampening piston 11. Other packing rings are used to ensure fluidtight connections between the various components.

The other actuator assembly B is constructed in a similar manner as the actuator assembly A and comprises a single-acting fluid reciprocatory motor 21 and a dampening device 28. The fluid motor 21 comprises a cylinder 22 having reciprocally mounted therein a working piston 23. A piston rod 23a is connected to the working piston 23 and slidably projects out of the cylinder 22. The working piston 23 divides the interior of the cylinder 22 into a working chamber 24 and a non-working chamber 25 which is vented to the atmosphere. A conduit 26 communicates with the working chamber 24 and functions to supply and exhaust motive fluid to the working chamber during operation of the fluid motor.

The dampening device 28 comprises a cylinder 29 having a closed end defining a wall portion of the working chamber 24 and an open end which is closed by an end cap 30. A dampening piston 32 is reciprocally mounted within the interior of the cylinder 29 and defines therewith on one side of the piston 32 a variable volume oil chamber or dampening chamber 34 and defines therewith on the other side of the piston 32 an air chamber 35 which is vented to the atmosphere through a bleed opening 35a. The piston 32 includes two rod portions 32a and 32b extending respectively into two bores provided in the ends of the cylinder 29. The rod portion 32a slidably extends into the working chamber 24 and a rod 36 is threaded into the rod portion 32b to enable movement of the dampening piston 32 from the exterior of the cylinder 29.

The oil chamber 34 is connected through an orifice 38 to the oil conduit 17 and by such a construction, the oil chamber 34 of the actuator assembly B communicates with the oil chamber 12 of the actuator assembly A. During use of the actuator assemblies, oil or another suitable viscous fluid is maintained within the oil chambers and the oil flows from one chamber to the other in response to reciprocal movement of the respective pistons as described hereinafter.

The operation of the actuating means will now be described assuming that the various components initially occupy the positions shown in FIG. 1. A conventional distributor valve (not shown) is actuated to supply motive fluid through the conduit 6 into the working chamber 4 of the reciprocatory motor while at the same time, the conduit 26 is opened to exhaust to permit the motive fluid in the working chamber 24 to be exhausted. The motive fluid supplied to the working chamber 4 acts against the working face of the working piston and urges the piston rightwardly through a working stroke causing the piston rod 3a to be extended out of the cylinder. During movement of the working piston 3 through its working stroke, the working piston 23 of the reciprocatory motor 21 is driven through its return stroke in synchronization with the working stroke of the piston 3 by means which will be described hereinafter. The movements of the pistons 3 and 23 are synchronized such that when one piston is at the head end of its cylinder, the other piston is at the rod end of its cylinder and this synchronization is maintained throughout the working and return strokes of the pistons.

As the psiton 3 completes its working stroke and approaches the rod end of the cylinder 2, the piston 23 completes its return stroke and approaches the head end of the cylinder 22. As the piston 23 approaches the head end of the cylinder 22, the piston abuts against the rod portion 32a of the dampening piston 32a and drives the piston 32 in a leftward direction. The oil contained within the oil chamber 34 opposes the leftward movement of the dampening piston 32 and as the force applied to the dampening piston 32 by the working piston 23 increases, the dampening piston 32 is urged leftwardly and forces the oil through the orifice 38 and then serially through the conduit 17 and the orifice 16 into the oil chamber 12. The flow orifices 16 and 38 coact with the viscosity of the oil to suitably restrict the flow of the oil to a degree sufficient to absorb the shock imparted to both the pistons 3 and 23 at the completion of their respective strokes. Thus the dampening devices 8 and 28 coact together to dampen movement of the pistons and to mitigate the shock given to the pistons at the completion of their strokes.

When it is desired to reverse the direction of movement of the pistons, the distributor valve (not shown) is reversed and motive fluid is then applied to the conduit 26 into the working chamber 24 while exhausted from the working chamber 4 through the conduit 6. The motive fluid acts against the working face of the piston 23 and urges the piston 23 in a rightward direction thereby extending the piston rod 23a from the cylinder 22. In synchronization with the working stroke of the piston 23, the piston 3 of the reciprocatory motor 1 is driven in a leftward direction through its return stoke thereby retracting the piston rod 3a back into the cylinder 2.

As the working piston 23 approaches the end of its working stroke, the working piston 2 approaches the end of its return stroke and abuts against the rod portion 11a of the dampening piston 11. At this instant, the oil chamber 12 is completely filled with oil and the oil chamber has its maximum volume. As the piston 3 is urged against the piston rod portion 11a, the dampening pistion 11 is moved in a leftward direction and forces the oil contained within the oil chamber 12 through the orifice 16 and then serially through the conduit 17 and the orifice 38 into the other oil chamber 34. Thus the kinetic energy of the working pistons 3 and 23 as they approach the end of their strokes is used to pressurize the oil and force same through the orifices 16 and 38 thereby reducing the shock occurring when the pistons strike the end of their respective cylinders. The dampening system composed of the dampening devices 8 and 28 thus cushions the impact of the working pistons at each end of their stroke.

The means for effecting synchronous movement of the working pistions 3 and 23 will now be described with reference to FIGS. 2 and 3. The output member comprises a cylinder 40 mounted for turning or oscillatory movement on a frame assembly 42. Suitable bearings are employed to mount the cylinder 40 for angular displacement on the frame assembly 42 and the actuator assemblies A an dB are positioned on opposite sides of the output member 40.

Figure 2:
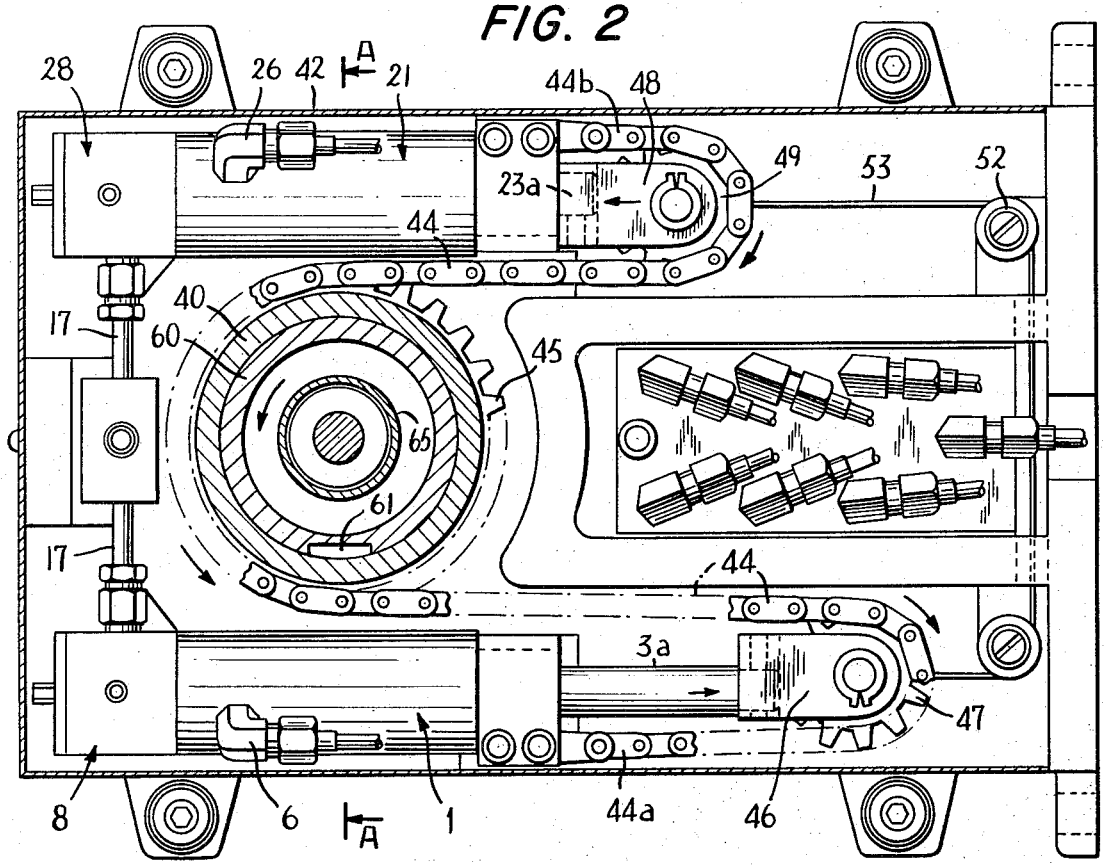
FIG. 2 is a plan view, partly in cross-section, of a portion of an industrial robot embodying the apparatus of the present invention and, FIG. 3 is a vertical cross-section taken along the line A—A in FIG. 2.
Figure 3:
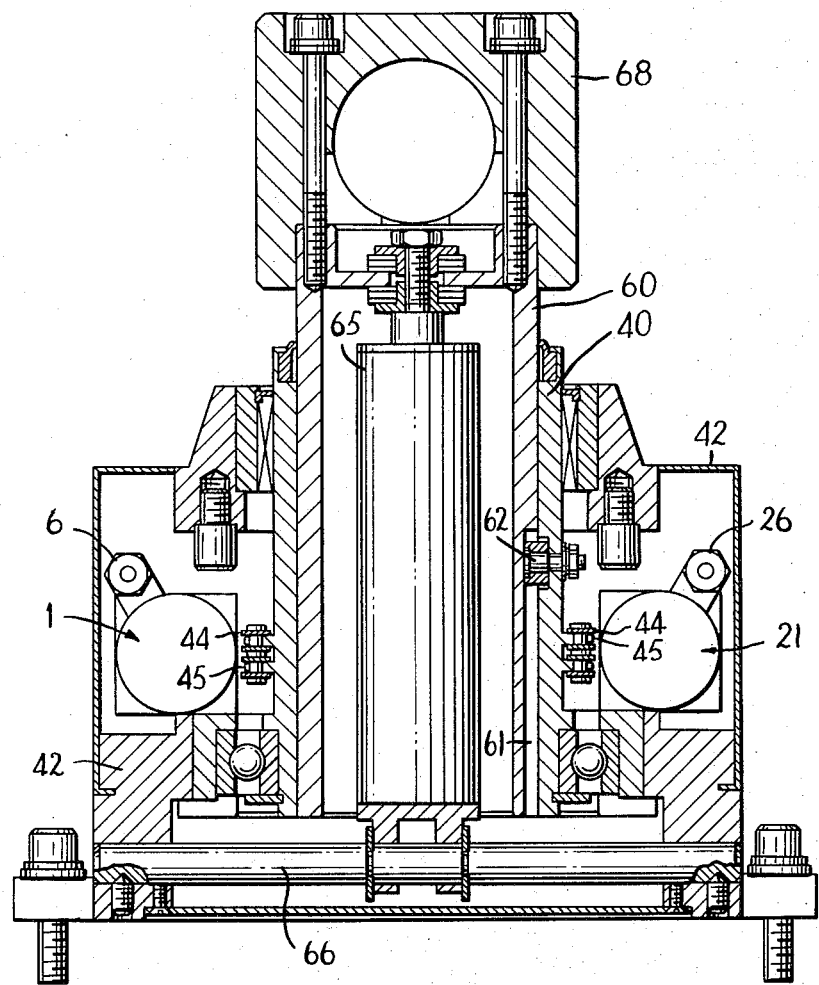

As seen in FIG. 2, the actuator assemblies A and B are coupled to the output member 40 by means of a flexible roller chain 44. The chain 44 engages with a set of sprockets 45 connected around the periphery of the cylinder 40 and the ends of the chain are respectively connected to the piston rods 3a and 23a of the actuating means. The piston rod 3a is connected to a plate member 46 and a sprocket wheel 47 is rotatably mounted on the plate member 46 and engages with the chain 44. One end 44a of the chain 44 is connected to the framework assembly 42 at a location adjacent the single-acting reciprocatory motor 1. In a similar manner, the piston rod 23a is connected to a plate member 48 and a sprocket wheel 49 is rotatably mounted on the plate member and engages with the chain 44. The other end 44b of the chain 44 is affixed to the framework assembly 42 at a location adjacent the single-acting reciprocatory motor 21.

In order to maintain the chain 44 in meshing engagement with the sprockets 45 and the sprocket wheels 47 and 49, a mechanism is provided for preventing undue slackening of the chain. The mechanism comprises a pair of pulleys 52 rotatably mounted on the framework assembly 42 at locations substantially along the direction of movement of the pistons 3 and 23. A wire rope 53 is threaded around the pulleys 52, 52 and is connected at one end to the plate member 46 (or to the piston rod 3a) and is connected at the other end to the plate member 48 (or to the piston rod 23a). In this manner, the wire rope 53 prevents both piston rods 3a and 23a from simultaneously retracting into their respective cylinders during nonuse of the apparatus and thus the chain 44 is maintained in meshing engagement with the various sprockets.

The output member 40 surrounds and is connected to a cylinder 60. The cylinder 60 is mounted for sliding movement within the cylinder 40 and is rotationally rigid with the cylinder 40 so that the angular oscillatory displacement of the cylinder 40 effects a corresponding displacement of the cylinder 60. A type of spline connection including a slot 61 in the cylinder 60 and a roller 62 rollable in the slot 61 and connected to the outer cylinder 40 enables the inner cylinder 60 to reciprocate relative to the cylinder 40 yet ensures that angular displacement of the cylinder 40 effects corresponding displacement of the cylinder 60.

A fluid reciprocatory motor 65 is mounted intriorly of the cylinder 60 and comprises a cylinder affixed at one end to a bar 66 mounted on the framework assembly 42. A piston is slidably mounted within the cylinder and has a piston rod connected to a sweep member 68. The sweep member 68 is also fixed to the inner cylinder 60 for movement therewith and by such a construction, the sweep member 68 may be raised or lowered by the reciprocatory motor 65 and the sweep member 68 may also be angularly displaced or oscillated by the coaction of the actuator assemblies A and B. driving the cylinder 40.

The details of the reciprocatory motor 65 have not been shown since such do not constitute part of the present invention and reference is herein made to U.S. patent application Ser. No. 212,344 for the constructional details of the motor 65. The additional conduits and fittings shown in FIG. 2 do not constitute part of the present invention and these components are used to control the application of motive fluid to other fluid motors used in conjunction with the reciprocatory motors 1, 21 and 65 to effect other types of movement of the mechanisms attached to the sweep member 68 as disclosed in the aformentioned application. The sweep member 68 is preferably connected to a robot transfer arm to effect controlled movement of the transfer arm by the reciprocatory motors 1, 21 and 65.

The operation of the apparatus will now be described with reference to FIG. 2. Assuming that the components are in the positions shown in FIG. 2 and assuming that it is desirable to angularly displace the cylinder 40 in a counterclockwise direction, motive fluid is applied to the reciprocatory fluid motor 1 to actuate the piston 3 and effect extension of the piston rod 3a from the cylinder 2 and at the same time, motive fluid is exhausted from the reciprocatory fluid motor 21 to enable the piston 23 to be driven through its return stroke thereby retracting the piston rod 23a back into the cylinder 22. As the piston rod 3a advances in a rightward direction, the sprocket wheel 47 is driven in a clockwise direction thereby tensioning the chain 44 and advancing same in a counterclockwise direction about the cylinder 40. As the piston rod 3a is extended and tension is applied to the chain 44, the piston rod 23a is driven back into the cylinder 22 by the force of the chain 44 as same is advanced by the reciprocatory motor 1. The chain 44 thus is driven in a counterclockwise direction in the vicinity of the cylinder 40 and the chain coacts with the sprockets 45 to impart a corresponding counterclockwise angular displacement of the cylinder 40.

In order to reverse the direction of angular displacement of the cylinder 40, the reciprocatory motor 21 is actuated causing the piston rod 23a to extend from the cylinder 22 while the piston rod 3a is driven back into the cylinder 2. As the piston rod 23a extends from the cylinder 22, the sprocket wheel 49 is driven in a counterclockwise direction to advance the chain 44 in a clockwise direction in the vicinity of the cylinder 40 thereby effecting clockwise angular displacement of the cylinder 40. During actuation of the motors 1 and 21, the impact of each piston as it approaches the end of its working and return strokes is cushioned by the coaction of the dampening devices 5 and 28.

Thus it may be appreciated that by controlling the supplying and exhausting of motive fluid to the single-acting reciprocatory motors 1 and 21, the angular displacement of the cylinder 40 may be accordingly controlled. The motive fluid preferably comprises compressed air though other fluids may be used. In accordance with the present invention, the synchronized motion of two reciprocatory motors is converted into oscillating motion of an output member. The dampening system effectively absorbs the shocks given to the pistons upon completion of their displacements and in addition, the dampening system effectively absorbs the shocks given to the cylinder 40 at the end of each movement.

The apparatus of the present invention is particularly suitable to effect oscillatory sweeping movement of an industrial robot transfer arm at very high speeds. The supplying and exhausting of the motive fluid may be controlled by a distributor valve, a series of electrically-operated solenoid valves, or cam-operated valves which each may be controlled in accordance with a predetermined program. The program is preferably contained on a punched card or the like and controls the desired sequence of mechanical movements to be performed by the industrial robot.

The invention has been described in conjunction with one preferred embodiment and many other modifications will become apparent to those skilled in the art

What we claim is:

1. Apparatus for effecting oscillatory movement of an output member comprising: an output member mounted to undergo oscillatory movement; a pair of fluid reciprocatory motors each having a reciprocatory working member reciprocal through a working stroke and a return stroke and each receptive of motive fluid during use of the apparatus to effect synchronous reciprocation of both working members in opposite stroke directions; means for dampening the impact of each working member at the end of both its working and return strokes, said dampening means comprising means defining a pair of variable volume chambers in fluid communication with each other and each positioned adjacent one of said fluid reciprocatory motors, a viscous dampening fluid contained within each variable volume chamber, and means for effecting contraction of one variable volume chamber in response to movement of one working member during each return stroke thereof thereby forcing said viscous dampening fluid from said one variable volume chamber into the other variable volume chamber to effect expansion of same resulting in the dampening of each working member at the end of its corresponding stroke and for effecting contraction of said other variable volume chamber in response to movement of the other working member during each return stroke thereof thereby forcing said viscous dampening fluid from said other variable volume chamber into said one variable volume chamber to effect expansion of same resulting in the dampening of each working member at the end of its corresponding stroke; and means for effecting oscillatory movement of said output member in response to synchronous reciprocation of both working members in opposite stroke directions.

2. Apparatus according to claim 1; wherein said last-mentioned means includes a flexible member in engagement with said output member operative to impart oscillatory movement to said output member in response to movement of said flexible member in opposite directions, and means connecting said flexible member to both working members to effect movement of said flexible member in opposite directions in response to synchronous reciprocation of both working members in opposite stroke directions.

3. Apparatus according to claim 2; wherein each fluid reciprocatory motor comprises a single-acting motor receptive of the motive fluid to actuate its working member through its working stroke; and wherein said means connecting said flexible member to both working members includes means responsive to the movement of each working member through its working stroke for simultaneously effecting movement of the other working member through its return stroke.

4. Apparatus according to claim 2; wherein said output member has a set of sprockets around the periphery thereof and said flexible member comprises a chain in meshing engagement with said sprockets, and wherein said means connecting said flexible member to both working members comprises a rotatable sprocket wheel connected to each working member and in meshing engagement with said chain whereby synchronous reciprocation of both working members in opposite stroke directions effects movement of said chain in opposite directions to thereby impart oscillatory movement to said output member.

5. Apparatus according to claim 1 including means defining a flow restriction between said pair of variable volume chambers to restrict the flow of viscous dampening fluid therebetween to increase the dampening effect.

6. Apparatus for effecting oscillatory movement of an output member comprising: an output member mounted to undergo oscillatory movement; a pair of fluid reciprocatory motors each having a reciprocatory working member reciprocal through a working stroke and a return stroke and each receptive of motive fluid during use of the apparatus to effect synchronous reciprocation of both working members in opposite stroke directions; dampening means for dampening the impact of each working member at the end of both its working and return strokes, said dampening means comprising a cylinder connected to each fluid reciprocatory motor, a piston slidable in each said cylinder defining therewith a variable volume chamber and having a rod portion engageable with the working member of the associated reciprocatory motor during each return stroke of said working member whereby movement of said working piston during its return stroke effects sliding movement of said piston in a direction to decrease the volume of said variable volume chamber, a conduit providing fluid communication between both variable volume chambers, and a viscous dampening fluid contained within said variable volume chambers and said conduit, whereby each working member during its return stroke engages with its associated piston and slides same in a direction to decrease the volume of one variable volume chamber and force the viscous dampening fluid therefrom through said conduit into the other variable volume chamber to increase the volume thereof and slide its associated piston into a position to engage with the other working member during its next return stroke thereby dampening the impact of each working member at the end of its stroke; and means for effecting oscillatory movement of said output member in response to synchronous reciprocation of both working members in opposite stroke directions.

7. Apparatus according to claim 6; including means defining a flow restriction between said pair of variable volume chambers to restrict the flow of viscous dampening fluid therebetween to increase the dampening effect.

8. Apparatus for effecting oscillatory movement of an output member comprising: an output member mounted to undergo oscillatory movement; a pair of fluid reciprocatory motors each having a reciprocatory working member reciprocal through a working stroke and a return stroke and each receptive of motive fluid during use of the apparatus to effect synchronous reciprocation of both working members in opposite stroke directions; dampening means for dampening the movement of each working member at the end of both its working and return strokes, said dampening means including means defining two dampening chambers in fluid communication with each other and receptive of a viscous dampening fluid during use of the apparatus and each positioned adjacent an end of one of said fluid reciprocatory motors, and means responsive to the movement of each working member as it approaches the end of its stroke which is adjacent its corresponding dampening chamber for pressurizing the dampening fluid contained therein and forcing it to the other dampening chamber; and means for effecting oscillatory movement of said output member in response to synchronous reciprocation of both working members in opposite stroke directions.

* * * * *